United States Patent [19]

Miyagi

[11] Patent Number: 4,632,420
[45] Date of Patent: Dec. 30, 1986

[54] COLLAPSIBLE BABY CARRIAGE

[75] Inventor: Takeshi Miyagi, Osaka, Japan

[73] Assignee: Zojirushi Baby Co., Ltd., Osaka, Japan

[21] Appl. No.: 694,165

[22] Filed: Jan. 23, 1985

[30] Foreign Application Priority Data

Jan. 23, 1984 [JP] Japan .................................. 59-10795
Jan. 23, 1984 [JP] Japan .............................. 59-7974[U]

[51] Int. Cl.⁴ .............................................. B62B 3/02
[52] U.S. Cl. .................................... 280/642; 280/650; 280/653; 280/47.39
[58] Field of Search ............... 280/642, 644, 643, 649, 280/650, 658, 47.39

[56] References Cited

U.S. PATENT DOCUMENTS

| | | | |
|---|---|---|---|
| 2,689,135 | 9/1954 | Toohey | 280/644 |
| 4,007,947 | 2/1977 | Perego | 280/642 |
| 4,132,429 | 1/1979 | Woods | 280/647 |
| 4,248,443 | 2/1981 | Ohlson | 280/647 |
| 4,435,012 | 3/1984 | Kassai | 280/643 |
| 4,478,427 | 10/1984 | Hyde | 280/642 |

FOREIGN PATENT DOCUMENTS 56-138765 3/1981 Japan .
56-66555 5/1981 Japan .
56-128267 10/1981 Japan .

Primary Examiner—David M. Mitchell
Assistant Examiner—K. L. Ferriter
Attorney, Agent, or Firm—Wenderoth, Lind & Ponack

[57] ABSTRACT

A collapsible baby carriage having front leg bars rotatably supporting front wheels at their lower ends, rear leg bars rotatably supporting rear wheels at their lower ends, a transverse connector bar connecting the front and rear leg bars at their upper ends, embracing members secured at one end to the lower end of a handle bar for detachably embracing the rear leg bars when the carriage is unfolded, anchoring link bars connected at their respective ends to a central portion of each front leg bar and to a lower portion of each auxiliary bar, a spring-loaded lock bar for resiliently engaging and disengaging with anchoring edges on the anchoring link bars, an lock bar receiving member pivoted to at least one of said anchoring link bars and a manipulation mechanism for disengaging the lock bar from the anchoring edges of the anchoring link bars.

2 Claims, 15 Drawing Figures

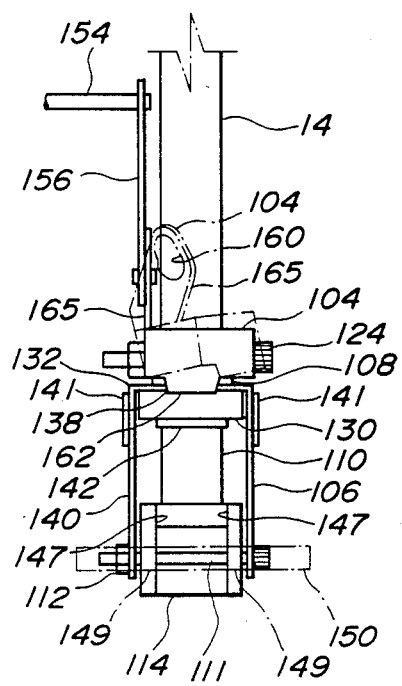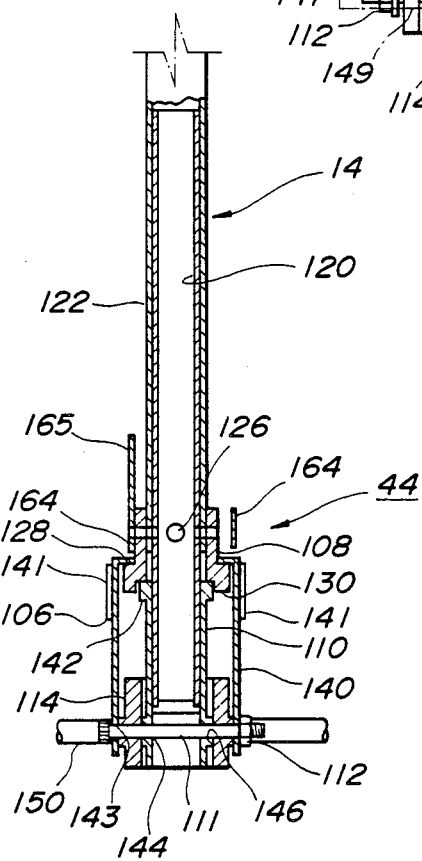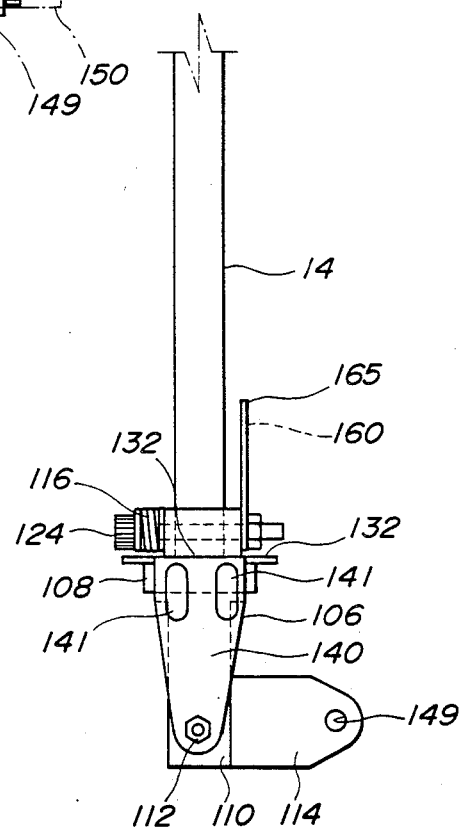

COLLAPSIBLE BABY CARRIAGE

FIELD OF THE INVENTION

This invention relates to a baby carriage and more particularly, to a collapsible or foldable baby carriage which can be positively collapsed to a compact condition by a single simple manipulation. Furthermore, this invention relates to a collapsible baby carriage which is provided with means adapted to provide caster effects to the front wheels so that the baby carriage can run easily.

BACKGROUND OF THE INVENTION

Hithertofore, a variety of collapsible baby carriages has been proposed and practically employed. Some of the prior art baby carriages of the type are shown, for example, in U.S. Pat. Nos. 4,007,947, 4,132,429, 4,248,443 and 4,353,577, Japanese Laid-Open Patent Application Nos. 63555/81 and 128267/81 and Japanese Laid-Open Utility Model Application No. 138765/81. However, all of the prior art baby carriages require substantial time and effort when collapsing or folding the carriage from its operative or unfolded condition to its collapsed condition and the folding or unfolding of the carriage in a limited space such as the porch of a residence is difficult. Additionally, if the locking device on the prior art baby carriage inadvertently unlocks, there is a possibility of the baby lying in the carriage falling hazardously. Furthermore, when the front wheels of the prior art baby carriages are not provided with casters, it is impossible to positively maintain the wheels in their intended orientation or the steering of the front wheels is not satisfactory.

That is, in the prior art baby carriages, since the front wheels are mounted on stationary axles, the front wheels need to be forced to change their orientation and to overcome the ground resistance which the wheels encounter when being turned in this way and manipulation of the carriage thus requires substantial effort. Thus, the prior art baby carriages have the disadvantage that the side faces of the front wheels prematurely wear away to a substantial degree.

SUMMARY OF THE INVENTION

The present invention therefore aims to provide a collapsible baby carriage which can effectively eliminate the disadvantages inherent in the prior art collapsible baby carriages.

According to the present invention, front leg bars and rear leg bars are connected together at their upper ends by means of a transverse connector bar, embracing members are fixedly secured to the lower ends of the leg portions of a handle bar to detachably embrace the rear leg bars at intermediate positions of the bars, auxiliary bars are attached at their lower ends to the embracing members and extend along the leg portions of the handle bar, elbow rests extend between and are connected at each end to intermediate portions of the auxiliary bars and the upper ends of the rear leg bars, anchoring link bars having saw-toothed anchoring edges at central portions thereof extend between and are connected at each end to intermediate portions of the front leg bars and lower portions of the auxiliary bars, a lock bar connector is disposed along at least one of the rear leg bars and is spring-loaded to resiliently engage and disengage a transverse lock bar with the anchoring edge on the associated anchoring link bar so as to lock and unlock the rear leg bar, a lock bar receiving member is pivoted to the side of the anchoring edge and resiliently contacts the lock bar such as to hold the lock bar in its engaged condition, a manipulation means is formed on a lower portion of the associated rear leg bar or on an upper portion of the handle bar to engage and disengage with the lock bar and both ends of an L-shaped link bar are connected, respectively, to the lower portion one of the auxiliary bars and a lower portion of the associated rear leg bar just above the associated embracing member whereby when the lock bar is disengaged from the anchoring edge by the manipulation means and the handle bar is pulled up to allow the engaging position between the lock bar and anchoring edge to pass over a dead point, the baby carriage can be folded into a compact condition in which the front wheels are positioned above the rear wheels. Thus, according to the present invention, even when the lock bar inadvertently disengages from the anchoring edge, the lock bar automatically returns to its original position if the engaging position between the lock bar and anchoring edge does not pass over the dead point, whereby the frame components of the baby carriage are maintained in the appropriate positions for use and the load imposed by the frame components maintains the lock bar and anchoring edge in their engagement, preventing inadvertent disengagement and thereby providing the baby carriage with a safety feature.

Furthermore, another object of the present invention is to provide a collapsible baby carriage in which when a locking device is unlocked, the front wheels are allowed to freely change their orientation and when the baby carriage is moved straight forwards or backwards in such a manner as to cause the front wheels to positively contact the ground, the locking device automatically locks to prevent the wheels from freely changing in orientation whereby the baby carriage can smoothly move straight ahead or to the rear.

The above and other objects and attendant advantages of the present invention will be more readily apparent to those skilled in the art from a reading of the following detailed description in conjunction with the accompanying drawings which show one preferred embodiment of the invention for illustration purposes only, and not in any way limiting the scope of the same.

BRIEF DESCRIPTION OF THE DRAWINGS

FIG. 10 is a front elevational view of the front wheel mounting arrangement with a portion thereof broken away showing by broken lines a portion of the wheel mounting arrangement to clearly illustrate the operative condition of one of the mounting members;

FIG. 11 is a side elevational view of FIG. 10;

FIG. 12 is a vertical cross sectional view of one of the front leg bars;

DETAILED DESCRIPTION OF THE PREFERRED EMBODIMENT

Figure 1:
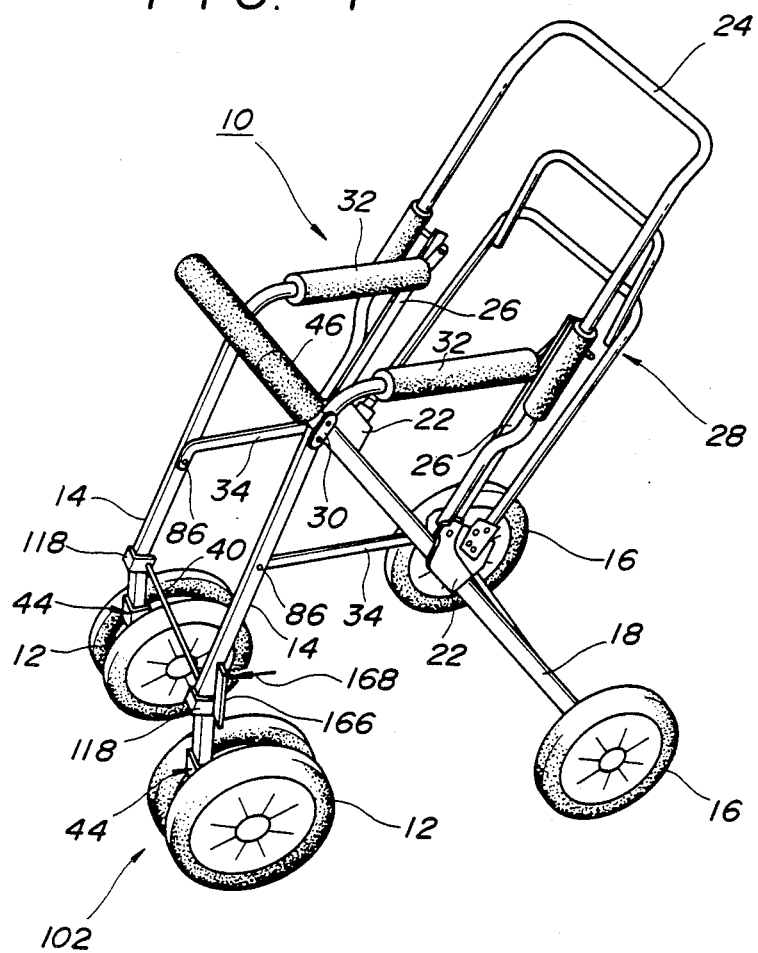
FIG. 1 is a schematic perspective view of a collapsible baby carriage embodying the invention and shown in its unfolded or operative condition for cradling a body in a horizontally reclining position.

The present invention will be now described referring to the accompanying drawings and, more particularly, to FIG. 1 thereof which generally shows the collapsible baby carriage of the invention in its unfolded or operative condition for cradling a baby in horizontally reclining position. As shown in FIG. 1, the collapsible baby carriage is generally shown by reference numeral 10 and generally comprises a pair of front leg bars 14, 14 having front wheels 12, 12 rotatably mounted at the lower ends thereof, a pair of rear leg bars 18, 18 having rear wheels 16, 16 rotatably mounted at the lower ends thereof, the distance between the rear leg bars being greater than that between the front leg bars, a pair of embracing members 22 having grooves 20, 20 formed in the undersides thereof (FIG. 9) for embracing the rear leg bars 18, 18 at intermediate positions between the opposite ends of the latter when the baby carriage 10 is unfolded, a U-shaped handle bar 24 having opposite leg portions, each of which having a lower end which is pivoted by means of a pivot pin 90 to the associated embracing member 22 between the opposite forwardly projecting extensions 64, 64 on the member 22, a pair of auxiliary bars 26, 26 fixedly secured at the lower ends thereof by means of pins 94 to central upwardly extending projections 92, 92 on the embracing members 22, 22 (FIG. 9), a conventional back rest mechanism 28 having back rest bars 29 pivoted at the lower ends thereof to pivot pins 98 which are in turn received in holes 97 in rear upwardly extending portions 96 on the embracing members 22 so that the inclination angle of the back rest mechanism can be adjusted, a pair of links 30, 30 connecting the upper ends of the corresponding front and rear leg bars 14, 18 for pivotal movement relative to each other, a pair of elbow rests 32, 32 connecting the upper ends of the rear leg bars 18 and the upper ends of the auxiliary bars 26 by means, for example, of pivot pins 74, 75 for pivotal movement relative to each other, a pair of anchoring link bars 34, 34 connected to intermediate positions of the front leg bars 14 and to the auxiliary bars 26 by means, for example, of pivot pins 86, 87 for pivotal movement relative to each other, at least one of said anchoring link bars being formed at the central area with a saw-toothed anchor edge, a pair of L-shaped link bars 36, 36 (FIG. 7) connecting the rear leg bars and the lower ends of the auxiliary bars 26 for pivotal movement relative to each other, a locking device 38 (FIGS. 2, 3, 4 and 8) provided along at least one of the rear leg bars 18 and adapted to engage the anchor edge on the associated anchoring link bar 34 to hold the baby carriage 10 in its unfolded or operative condition, a front transverse bar 40 (FIGS. 1 and 14) extending between and connected at the opposite ends thereof to the pair of front leg bars 14 at their lower ends such as to maintain a predetermined space between the leg bars, a rear transverse bar 42 (FIGS. 2 and 3) extending between and connected at the opposite ends to the rear leg bars 18 such as to maintain a predetermined space between the leg bars, said rear transverse bar having rear wheels 16, 16 mounted at the opposite ends thereof, and a conventional brake device (not shown) adapted to extend and retract thereby engaging and disengaging with the rear wheels 16 when it is desired to effect braking and free-wheeling, respectively, of the baby carriage.

Figure 5:
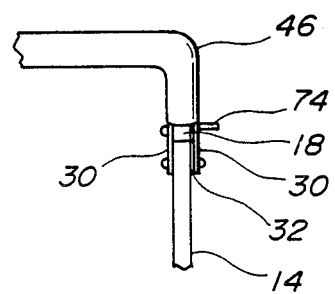
FIG. 5 is a front elevational view of the circled portion generally shown by V in FIG. 2.
Figure 9:
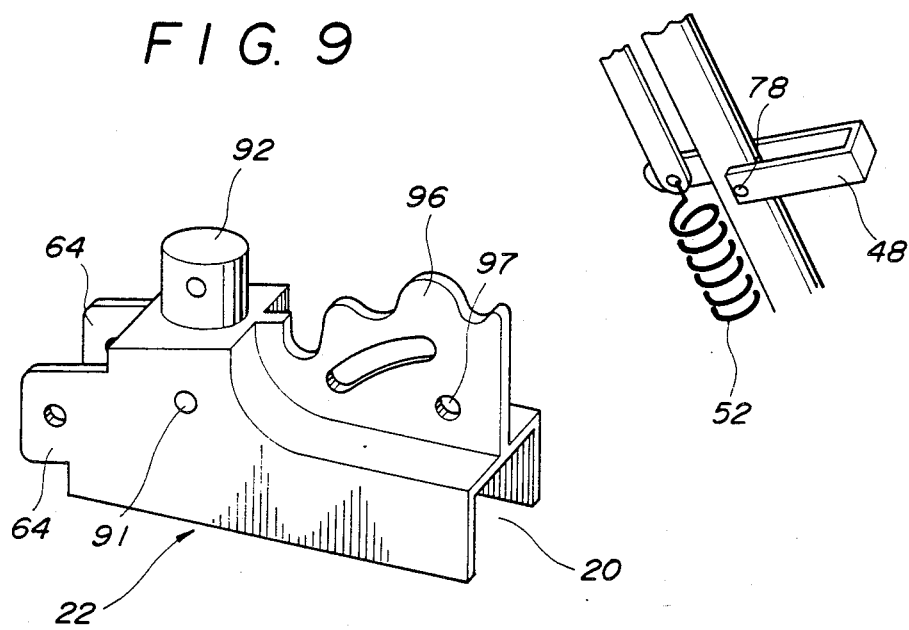
FIG. 9 is a perspective view of one of the embracing members on an enlarged scale.

The front wheels 12, 12 are connected to the front leg bars 14, 14 by means of a multi-direction caster arrangement (FIG. 13), a description of which will be made hereinafter.

embodiment, although the links 30, 30 are shown as separate members, the links may, within the scope of the invention, be formed integrally with the associated elbow rests 32 as shown in FIG. 5. It will also be appreciated that the L-shaped link bars 36 can be directly pivoted to the embracing members 22 instead of being pivoted to the lower ends of the auxiliary bars 26 as shown. A means for preventing the body of the baby carriage from rocking from side to side, in the illustrated embodiment, can comprise only the front and rear transverse bars 40, 42, but similar transverse bars can be additionally provided between the central areas of the rear leg bars 18, 18 and between the embracing members 22, 22, respectively, for desired or necessary purposes. Any desired transverse bar may be snugly fitted at its opposite ends in holes 91 provided in the embracing members 22 (only one embracing member is shown in FIG. 9). If desired or necessary, a conventional foot rest (not shown) may be attached between the anchoring bars 34 or the front leg bars 14 and a luggage basket (not shown) may be attached to the rear transverse bar 42 or elsewhere. Although the elbow rests 32 are shown as being covered by buffer covers in the illustrated embodiment, it should be understood that such buffer covers are not in any way essential components in the baby carriage of the invention. Similarly, although the upper ends of the rear leg bars 18 are connected together by a transverse bar 46 which is covered by a buffer cover in the illustrated embodiment, the covering of the transverse bar 46 is also optional, and not essential and the buffer cover may be removed from the transverse bar if the cover becomes an impediment when a baby is being placed in or taken out of the baby carriage. A sleeve may be fitted on an intermediate position of each of the legs of the U-shaped handle bar 24, the sleeves serving to connect the lower straight portions and the upper U-shaped portions of the handle bar legs together when the legs of the handle bar 24 are formed of the straight and U-shaped portions, which components are made separate from the viewpoint of acceleration of manufacturing operation, but it should be understood that the handle bar can be made as an integral member.

Figure 6:
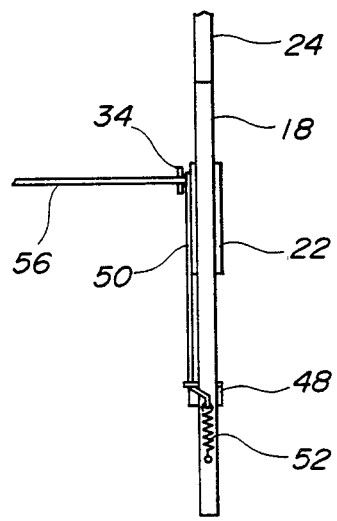
FIG. 6 is a view as seen from the bottom of FIG. 2 with a portion thereof broken away.
Figure 7:
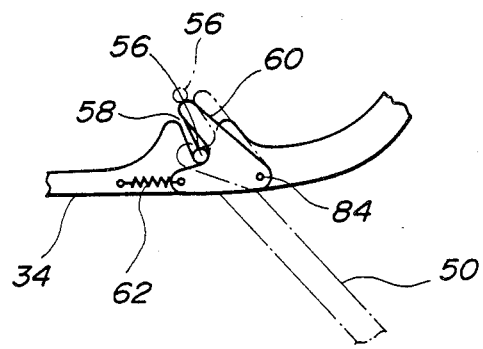
FIG. 7 is a cross sectional view on an enlarged scale of the locking arrangement with a portion thereof broken away.
Figure 8:
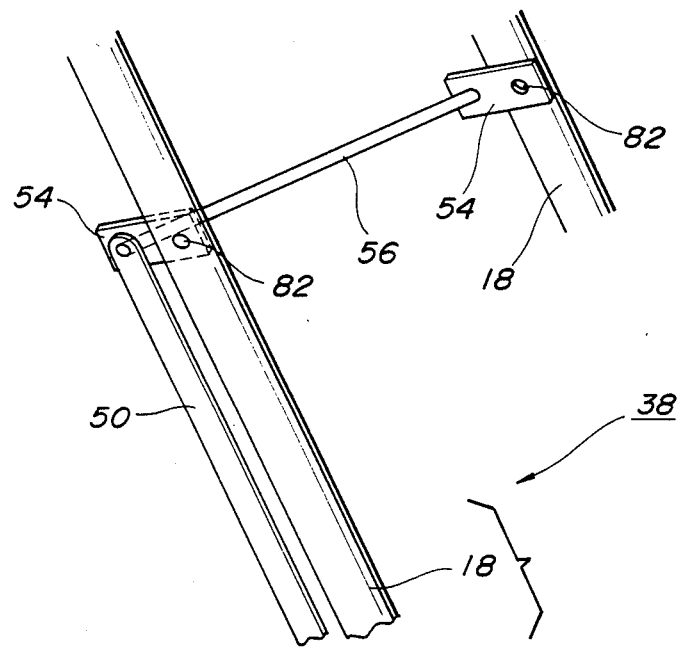
FIG. 8 is a perspective view on an enlarged scale of the locking device with a portion thereof broken away.

FIGS. 6 through 8 show the locking device 38 in detail. The locking device 38 comprises a treadle bar 48 pivoted to the lower end of at least one of the rear leg bars 18 in a position for operation by the tip of the user's foot, a lock bar connector 50 pivoted at the lower end thereof to the associated rear leg bar 18, a spring 52 biasing the lock bar connector 50 downwardly, a pair of left- and right-hand side links 54, 54 pivoted to the rear leg bars 18, 18, one of the links 54 supporting the upper end of the lock bar connector 50, a transverse back bar 56 supported at opposite ends thereof in the two links 54 such as to move in response to upward and downward movement of the lock bar connector 50 and guide slots 58 formed at central portions of the pair of anchoring link bars 34 (FIG. 7) for the purpose of receiving the opposite ends of the transverse lock bar 56. As more clearly shown in FIG. 7, transverse lock bar receiving pieces 60 can be pivoted to the anchoring link bars 34. The lock bar receiving pieces 60 normally hold the transverse lock bar 56 in the guide slots 58 under the force of springs 62 which are anchored at one end to the anchoring link bars 34. However, the transverse bar receiving pieces 60 are not essential components of the baby carriage of the invention.

In use of the baby carriage, the transverse lock bar 56 is forced to enter the guide slots 58 in the anchoring link bars 34 under the force of the springs 52 whereby the baby carriage 10 is unfolded and maintained in its unfolded condition by the stabilized four-joint link mechanism comprising the anchoring link bars 34, front leg bars 14, elbow rests 32 and auxiliary bars 26. It is also contemplated that the handle bar 24 which is pinned to the embracing members 22 (FIG. 9) between the forwardly projecting extensions 64, 64 on the embracing members can be rotated from the position shown in FIG. 2 in the direction of the arrow 66 in the Figure so that the user can operate the baby carriage 10 while facing the baby to be carried in the baby carriage.

For this purpose, the handle bar 24 has manipulation members 70 pivoted thereto, each having a hook 68 extending therefrom to be extended and retracted as the associated manipulation member 70 pivots in one or the other direction. When the handle bar 24 is in the position shown in FIG. 2 at the rear of the baby carriage 10, the manipulation members 70 are pivoted to assume the position in which the hooks 68 extend to engage pins 72 on the auxiliary bars 26, for example. When the handle bar 24 is rotated to the front of the baby carriage 10, the manipulation members 70 are pivoted 180° to retract the hooks 68 from engagement with the pins 72 and to engage them with the front pins 74 on, for example, the rear leg bars 18, elbow rests 32 or elsewhere.

Figure 2:
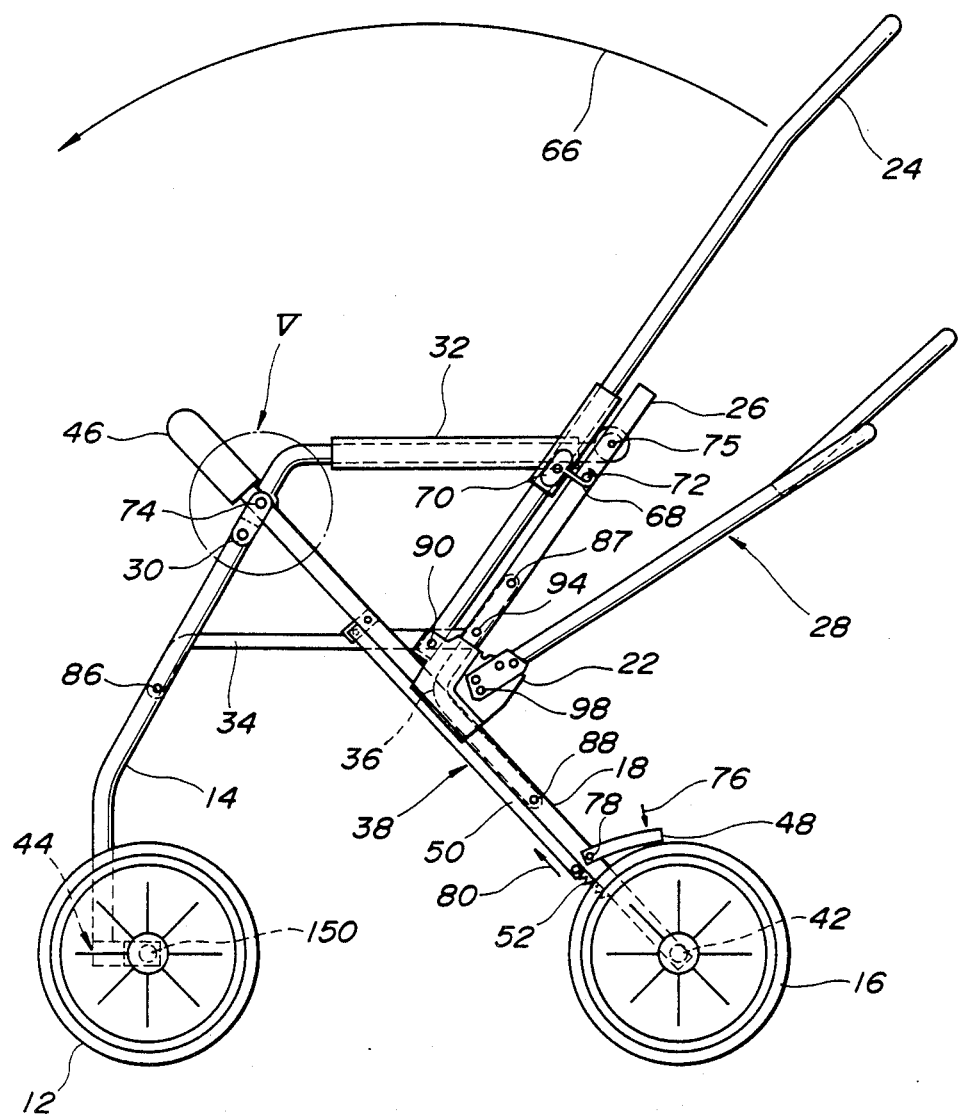
FIG. 2 is a side elevational view of the baby carriage of FIG. 1.
Figure 3:
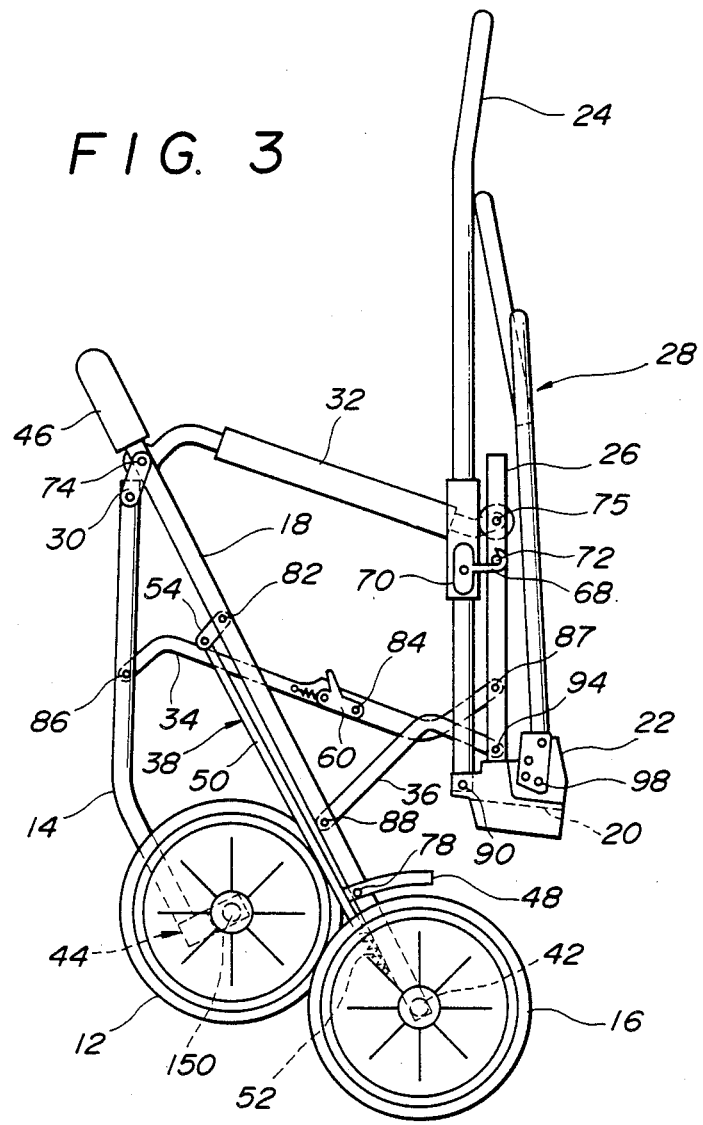
FIG. 3 is a side elevational view of the baby carriage showing the carriage in a partially collapsed or unfolded condition.

When it is desired to collapse the baby carriage 10 from the operative or unfolded condition shown in FIG. 2, first of all, the treadle bar 48 is stepped on to move it in the direction of the arrow 76 in FIG. 2 against the force of the spring 52 whereupon treadle bar 48 rotates in the clockwise direction about a pin 78 (FIG. 8) and the lock bar connector 50 moves in the direction of arrow 80 shown in FIG. 2. As the lock bar connector 50 moves in the above-mentioned direction, the links 54 rotate in the clockwise direction about pins 82 and the transverse lock bar 56 moves upwardly out of the guide slots 58 (FIG. 7) while causing the transverse lock bar receiving pieces 60 to rotate in the clockwise direction about pins 84 against the force of the springs 62 seen in FIG. 7. After the transverse lock bar 56 has been completely released from the guide slots 58, the handle bar 24 is rotated forwardly and downwardly whereby the embracing members 22 are disengaged from the rear leg bars 18 and, at the same time, the elbow rests 32, anchoring link bars 34 and L-shaped link bars 36 rotate in the clockwise direction about pins 74, 86 and 88, respectively as illustrated in FIG. 3. Thus, the front leg bars 14 approach the rear leg bars 18 and as the elbow rests 32, anchoring link bars 34 and L-shaped link bars 36 continue to rotate in the clockwise direction, the front and rear leg bars 14, 18 approach the handle bar 24 in unison. While the front and rear leg bars 14, 18 are moved in unison towards the handle bar 24, the transverse lock bar 56 moves towards the front leg bars 14 while sliding over the anchoring link bars 34. However, if the sliding movement of the transverse lock bar 56 over the anchoring link bars 34 terminates before the front leg bars 14, elbow rests 32, auxiliary bars 26 and anchoring link bars 34 form the substantially rectangular configuration shown in FIG. 3 or the locking device 38 inadvertently unlocks itself during the use of the baby carriage, the weight of the body of the baby carriage and/or the baby therein causes the anchoring link bars 34 to move the front wheels 12 on the front leg bars 14 away from the rear wheels 16 on the rear leg bars 18 to thus allow the transverse lock bar 56 to return to its initial position, thereby preventing the baby carriage from inadvertently collapsing and safeguarding the baby against possible accident.

Figure 4:
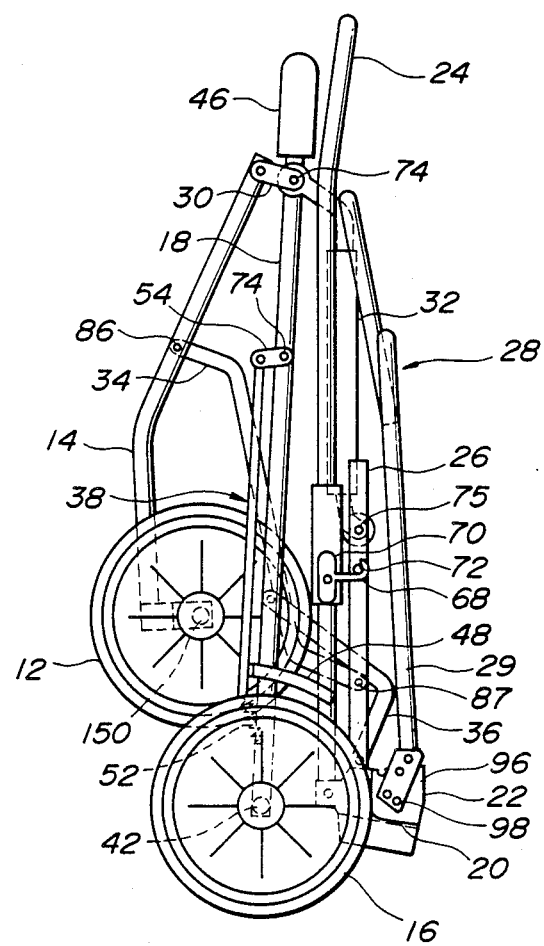
FIG. 4 is a side elevational view of the baby carriage showing the carriage in its fully collapsed or folded condition.

As the handle bar 24 is further rotated forwardly and downwardly from the position shown in FIG. 3, the rear leg bars 18 assume a substantially upright position in which the rear leg bars become substantially parallel to the handle bar 24 and the elbow rests 32, anchoring link bars 34 and L-shaped link bars 36 further rotate in the clockwise direction until the elbow rests 32 position themselves inwardly of the handle bar 24, the anchoring link bars 34 position themselves inwardly of the rear leg bars 18, 18, the L-shaped link bars 36 position themselves inwardly of the handle bar 24 and the front wheels 12, 12 position themselves inwardly of and about the rear wheels 16, 16, whereby the body of the baby carriage is folded to a substantially compact state and is maintained in this condition. It will be appreciated that if the back rest bars 29 of the back rest mechanism 28 are extended downwardly by a small distance as known in the art, or the embracing members 22 are formed with projections extending downwardly therefrom by a small distance, the vertical alignment between the back rest bars and the embracing members adjacent to the rear wheels can be easily obtained, as shown in FIG. 4.

In the present invention, in place of the provision of the treadle bar 48 of the locking device 38, when the position of the lock bar connector 50 is moved upwardly or a wire or the like is attached to the transverse lock bar 56 so that the lock bar can be directly pulled out of the guide slots 58, the baby carriage can be simply folded by a single manipulation.

When the user desires to unfold, i.e. put up, the baby carriage from the folded condition, it is only necessary to pull the handle bar 24 upwardly. Upon pulling-up of the handle bar 24, the front wheels, rear wheels and rear leg bars move downwardly by the force of their own weight to automatically assume the partially unfolded condition shown in FIG. 3 initially and then the fully erect or unfolded condition shown in FIG. 2. If necessary, the transverse bar member 46 on the upper portions of the rear leg bars 18 can be pushed forwardly by a small distance away from the handle bar 24 to more promptly unfold, the baby carriage 10 In the fully unfolded or erect condition of the baby carriage 10, the entire weight of the baby in the carriage is transmitted through the embracing members 22 to the rear leg bars 18 between the front and rear wheels 12, 16. On the other hand, the front and rear wheels can be perfectly maintained in their carriage support positions by the above-mentioned four-jornt linkage to thereby always assure a stable erect condition of the baby carriage.

FIGS. 10 through 15 show the caster arrangement 44 of the invention in detail. FIG. 1 shows the caster arrangement 44 as mounted on the front wheels 12, 12. The caster arrangement 44 generally comprises caster manipulation means 102 provided between the front leg bars 14, 14, a pair of mounting members 104, 104, inverted U-shaped connector members 106, 106 for cooperating with the mounting members 104, a pair of couplings 108, 108 connecting the front leg bars 14, 14 and the connector members 106, 106, tubular members 110, 110 rotatably disposed within the couplings 108, 108 and a pair of axle mounting members 114, 114 (FIG. 15) each supporting the associated front wheel 12 and connected at the other end to the associated connector member 106 and the tubular member 110 by means of a bolt and nut unit 111, 112.

The front leg bar 14 comprises a downwardly extending inner pipe 120 and an outer pipe 122 surrounding the inner pipe 120 and extending upwardly beyond the top of the inner pipe to the associated link 30. However, the inner pipe 120 may be eliminated when the outer pipe 122 itself has sufficient rigidity. The coupling-108 is secured to the lower end of the associated front leg bar 14 by means of a through hole 109 in the coupling 108 and a bolt 124 received in the through hole 109. In FIG. 12, the bolt 124 is passed through a through hole 126 in the inner pipe 120 after the pipe assembly 120, 122 has been rotated 90° from the orientation of the pipe assembly shown in FIGS. 10 and 11. As more clearly shown in FIG. 14, the coupling 108 has at the lower end thereof a flange 128 from which a cylindrical wall 130 depends. The flange 128 on the coupling 108 supports the top 132 of the associated connector member 106 by means of an opening 134 formed in the connection member top 132. The above-mentioned bolt 124 holds the associated mounting member 104 and a spring 116 thereon. One end of the spring 116 is anchored to a recess 136 at the upper end of the associated coupling 108 and a key-shaped other end of the spring is suspended from the associated mounting member 104 whereby the spring 116 normally urges the mounting member 104 in the clockwise direction about the bolt 124 shown in FIG. 13.

The rectangular top 132 of the connector member 106 is formed at the opposite ends thereof with a pair of opposite notches 138, 138 and a pair of legs 140, 140 depend from the opposite sides of the top 132. The outer surface of each leg 140 is formed with reinforcing vertical ridges 141 at an upper portion thereof (FIG. 12).

Vertically disposed between the leg portions 140, 140 of the connector member 106 is a tubular member 110 having a flange 142 at the upper end, the flange 142 being positioned within the cylindrical wall 130 of the coupling 108 below the top 132 of the connector member 106.

A bolt 111 extends through aligned holes 143 in the leg portions 140 of the connector member 106 and aligned with holes 144 in the tubular member 110. The bolt 111 also extends through aligned holes 146 in the axle mounting member 114 and is held in position by a nut 112 fastened against the bolt.

The axle mounting member 114 has a substantially H-shaped construction and includes, as known in the art, a pair of leg portions 147, 147 at one end defining a cavity 148 therebetween for receiving a rubber member (not shown) therein to thereby give a resiliant action to the body of the baby carriage. The other end of the axle mounting member 114 is formed with aligned holes 149, 149 for rotatably receiving the front wheel axle (not shown) and the above-mentioned front wheels 12, 12 are mounted at the opposite ends of the axle.

Figure 14:
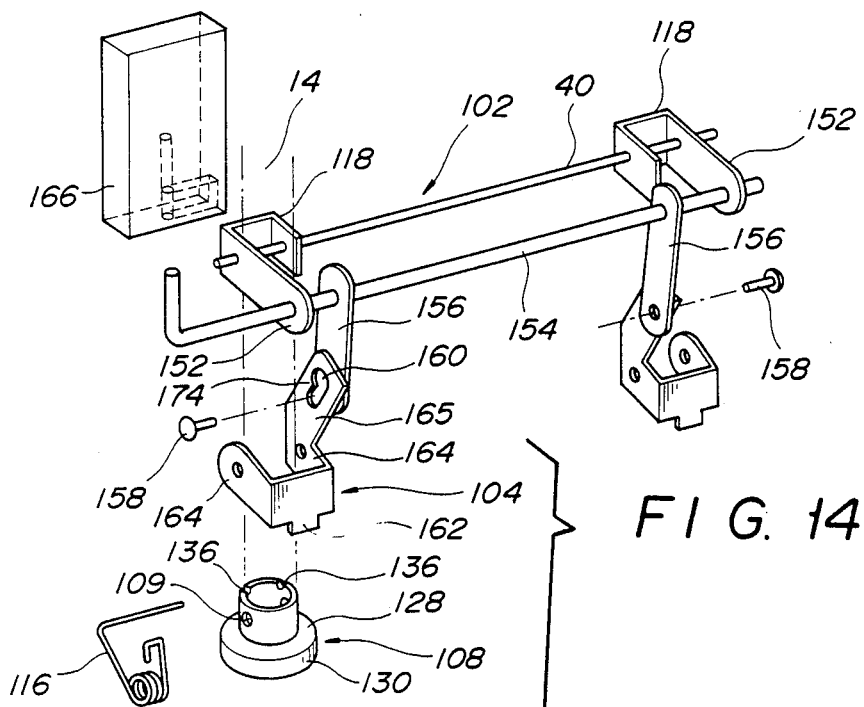
FIG. 14 is an exploded perspective view of the caster arrangement.
Figure 15:
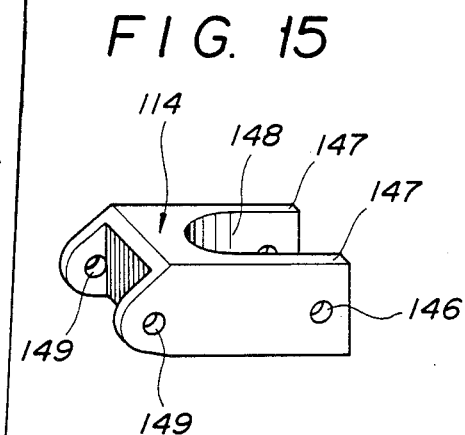
FIG. 15 is a perspective view of one of the wheel mounting members.

As more clearly shown in FIGS. 1 and 14, the caster manipulation means 102 is secured to the front leg bars 14, 14 by conventional means such as fasteners and is supported in brackets 118 to which the opposite ends of the above-mentioned transverse front bar 40 are secured. The brackets 118 have a substantially U-shaped configuration each including longer and shorter leg portions. The longer leg portions 152 of the brackets 118 rotatably support a transverse manipulation bar 154 at the leading ends of the brackets. One end of the transverse manipulation bar 154 is bent at a right angle relative to the rest of the bar and a pedal 166 engages with the bent end of the transverse manipulation bar 154. A pair of connector links 156 are secured at one end by such means as welding to the transverse manipulation bar 154 and the other ends of the connector links 156 have pins 158 secured thereto. The above-mentioned mounting members 104 have a substantially U-shaped configuration each including a pair of leg portions 164, 164 and a central portion connecting the leg portions together. An extension 165 integrally extends from one of the leg portions 164 and is formed with a substantially heart-shaped slot 160 through which the pin 158 on the associated link 156 extends so that the mounting member 104 is connected to the associated link 156 for movement relative to the latter. The central portion of each of the mounting members 104 has an engaging projection 162 depending from the underside thereof for a purpose to be described hereinafter. The leg portions 164, 164 of the mounting member 104 hold the associated coupling 108 therebetween and the mounting member 104 and coupling 108 as well as the spring 116 are held together by the bolts 124 as described hereinabove.

Figure 13:
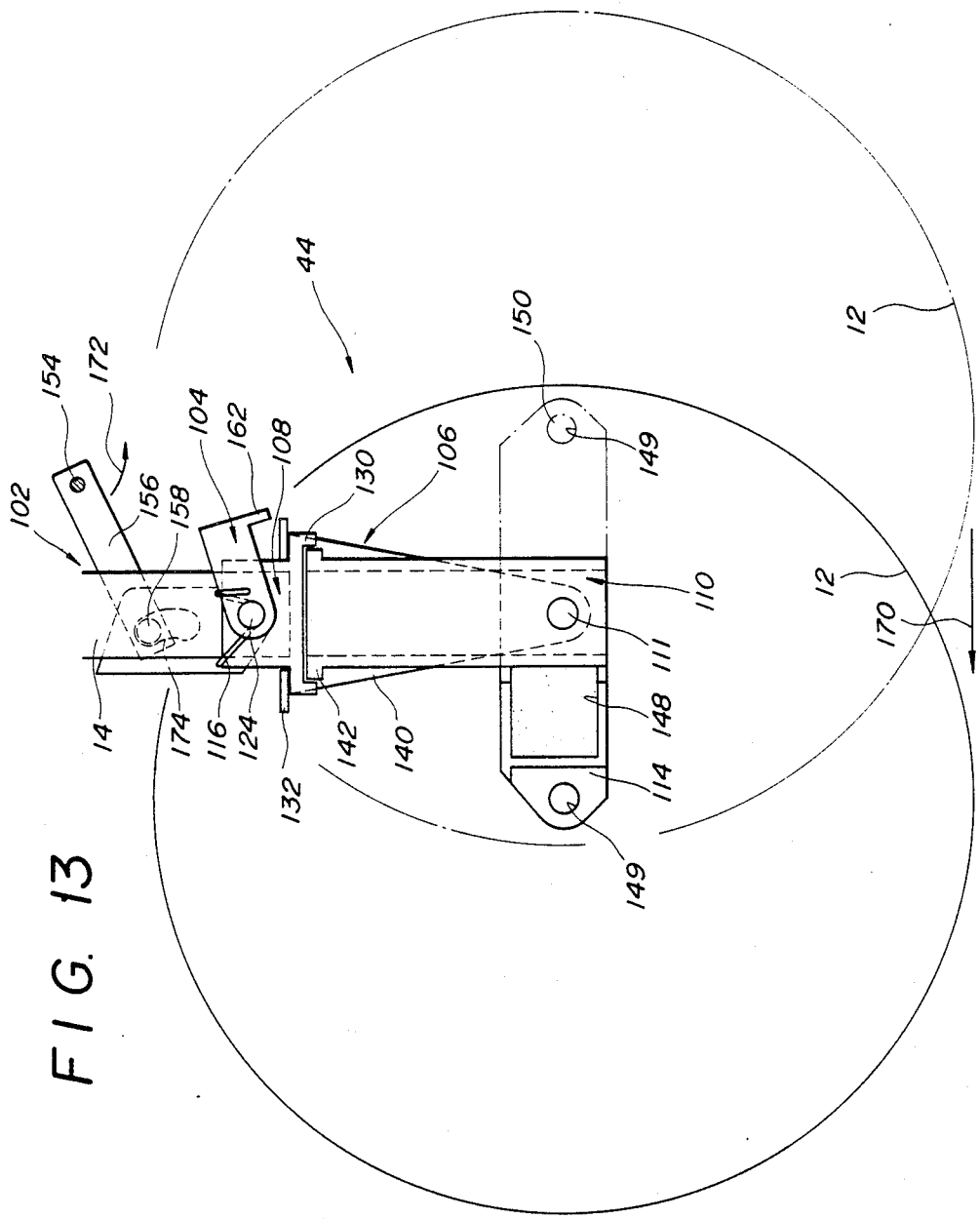
FIG. 13 is a side elevational view of the caster arrangement showing the operative condition of the arrangement.

With the above-mentioned construction and arrangement of the components of the baby carriage according to the present invention, in operation, the user pulls the pedal 166 rearwardly in the direction opposite to that of the arrow 168 by his foot or hand whereupon the transverse manipulation bar 154 rotates relative to the brackets 118 to bring the links 156 to the position shown in FIG. 13. Thus, the pins 158 move upwardly along the guide slots 160 against the resilient force of the springs 116 and are resiliently held there. Thus, the mounting members 104 rotate in the counterclockwise direction about the bolts 124 to assume the position shown in FIG. 13 in which the engaging projections 162 on the mounting members 104 disengage from the notches 138 in the connector members 106. With these components in these positions, when the user pushes the baby carriage in the direction of the arrow 170 in FIG. 13, the front wheels 12 on the axle 150 are allowed to rotate freely with respect to the couplings 108 secured to the front leg bars 14 between the solid and broken lines shown in FIG. 13 together with the axle mounting members 114, tubular members 110 and connector members 106 to thereby obtain the desired caster effects.

On the other hand, when the rotative movement of the front wheels 12 relative to the front leg bars 14 is desired to be limited so as to push the baby carriage straight, the user operates the pedal 166 in the direction of the arrow 168 in FIG. 1 whereupon the transverse manipulation bar 154 and links 156 rotate in unison in the direction of the arrow 172 in FIG. 13 together with the pedal 166. Thus, the pins 158 on the links 156 slide down the guide slots 160 in the mounting members 104. When the pins 158 go over the centers 174 of the guide slots 160 as the pins 158 slide down the slots, the resilient force applied to the mounting members 104 which holds the members in the position of FIG. 13 is released therefrom, allowing the mounting members to rotate in the clockwise direction about the bolts 124 to the position shown in FIG. 10. In this position of the mounting members 104 shown in FIG. 10, the lower edges of the leg portions 164 of the mounting members 104 resiliently rest on the tops 132 of the connector members 106.

Therefore, when the notches 138 in the connector members 106 are in the position for receiving the engaging projections 162 on the mounting members 104 in dependence upon the orientation and/or position of the front wheels 12, or when the front wheels are positioned in parallel to the direction of moving of the body of the baby carriage straight, the projections 162 are resiliently forced into the notches 138. However, if the front wheels are orientated in any direction other than the straight movement direction by caster effects, the projections 162 are positioned along the peripheries of the tops 132 of the connector members 106 and thereafter, when the front wheels are orientated in parallel to the body of the baby carriage due to caster effects which are produced as the baby carriage advances or retreats, the projections 162 slide over the upper surfaces of the connector member tops 132 until the engaging projections are resiliently forced into the notches 138 whereupon free movement of the connector members 106 relative to the couplings 108 secured to the front leg bars 14 is limited and thereby the front wheels 12 lose their caster effects on the body of the baby carriage. As a result, the body of the baby carriage is allowed to freely move straight ahead or to the rear. Thus, according to the present invention, even when the front wheels are orientated in any particular direction, the pedal 166 can be manipulated freely and the rotative movement of the front wheels can be controlled for straight movement of the baby carriage.

When the front wheels 12 are to be again given caster effects, as mentioned hereinabove, the pedal 166 is manipulated in the direction opposite to the direction of the arrow 168 whereby the links 156 move in the direction opposite to the direction of the allow 172 in FIG. 13 and the pins 158 on the links 156 move upwardly along the guide slots 160 in the mounting members 104 against the force of the springs 116. When the pins 158 go over the centers 174 of the slots 160, the resilient force of the springs 116 is fully supported by the pins 158 and the mounting members 104 are now positively held in the position shown in FIG. 13 whereby the projections 162 are fully disengaged from the notches 138 to produce caster effects in the front wheels 12.

While only one embodiment of the invention has been shown and described in detail, it will be understood that the same is for illustration purposes only and is not to be taken as a definition of the invention, reference being directed for that purpose to the appended claims.

What is claimed is:

1. A collapsible baby carriage comprising front leg bars, rear leg bars, a transverse connector bar extending between and connected at both ends thereof to upper ends of said front and rear leg bars to connect said front and rear leg bars together, a handle bar having spaced apart lower ends, embracing members each of which is secured to a respective one of said lower ends of said handle bar for detachably embracing one of said rear leg bars at an intermediate portion thereof, auxiliary bars each of which has a lower end fixed on a respective one of said embracing members, elbow rests each of which is pivotally connected at one end thereof to an upper end of a respective one of said auxiliary bars and at the other end thereof to a corresponding upper end of one of said rear leg bars, anchoring link bars each of which is pviotally connected at one end thereof to an intermediate portion of one of said front leg bars and at the other end thereof to a lower portion of one of said auxiliary bars, each of said anchoring link bars having a saw-toothed anchoring edge at a central portion thereof, a spring-loaded lock bar means including a lock bar for resiliently engaging and disengaging with said anchoring edge so as to resiliently hold a respective one of said rear leg bars in a working position, a lock bar receiving member pivotally attached to a side of each said anchoring edge for resiliently holding said lock bar in an engaged position, a manipulation means for disengaging said lock bar from each said anchoring edge of said anchoring link bars, and an L-shaped link bar pivotally connected at one end thereof to a lower portion of said respective one of said rear leg bars and at the other end thereof to a lower portion of a corresponding one of said auxiliary bars whereby said L-shaped link bar extends along said respective one of said rear leg bars and a corresponding one of said auxiliary bars when in the working position.

2. A collapsible baby carriage having cornering front wheels comprising spaced apart front leg bars rotatably supporting said front wheels, spaced apart rear leg bars, the space between said front leg bars being smaller than the space between said rear leg bars, a transverse connector bar connecting said front and rear leg bars together at upper ends thereof, a U-shaped handle bar having opposite leg portions, embracing members each of which is secured to a respective lower end of one of said leg portions of said handle bar for detachably embracing a respective one of said rear leg bars, auxiliary bars each of which has a lower end which is fixed on a respective one of said embracing members, elbow rest members each of which is pivotally connected at one end thereof to a respective upper portion of said auxiliary bar and at the other end thereof to a respective one of said upper ends of said rear leg bars, anchoring link bars each of which is pivotally connected at one end thereof to an intermediate portion of a respective one of said front leg bars and at the other end thereof to said lower portion of a respective one of said auxiliary bars, each of said anchoring link bars having a saw-toothed anchoring edge at a central portion thereof, a spring-loaded lock bar means including a lock bar for resiliently engaging with and disengaging from each said anchoring edge on a respective one of said anchoring link bars to lock and unlock a corresponding one of said rear leg bars from a working position, a lock bar receiving member pivoted to a side of each said anchoring edge to resiliently hold said lock bar in an engaged condition, and a manipulation means for disengaging said lock bar from each said anchoring edge of each of said anchoring link bars.

* * * * *